Oct. 19, 1937.   W. P. COX   2,096,321
TAPER ROLLER BEARING AND CAGE
Filed Sept. 12, 1935
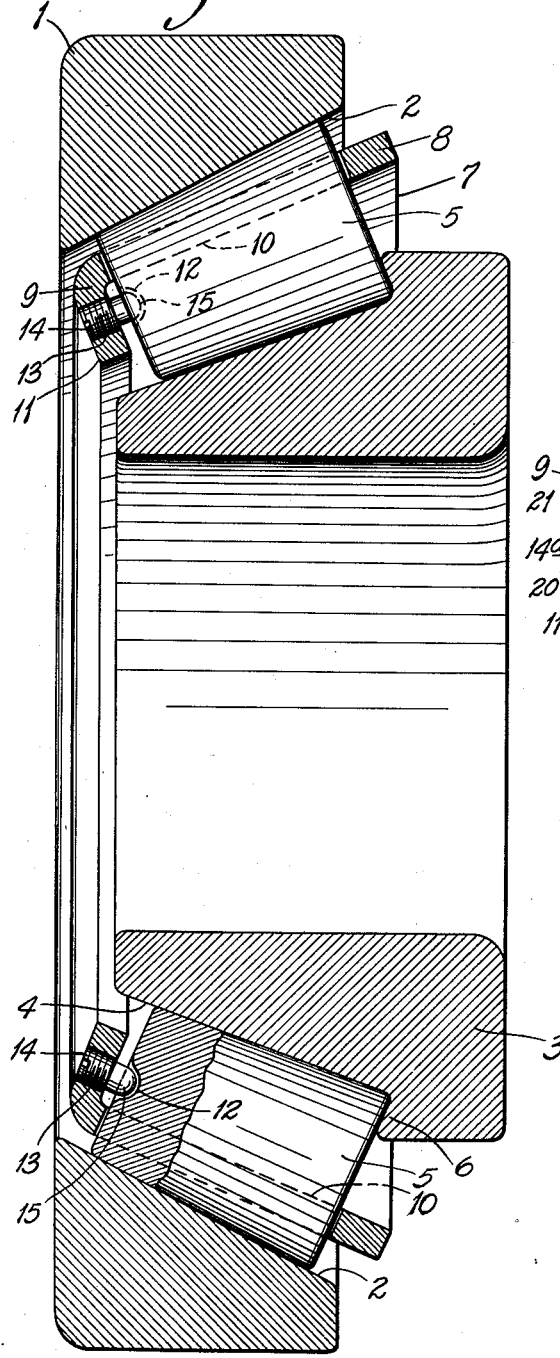
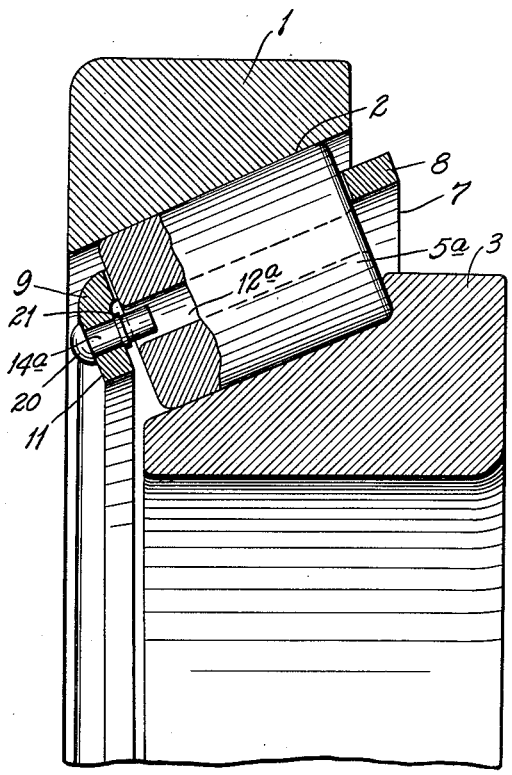
INVENTOR:
William P. Cox,
by Cantlan & Gravely,
HIS ATTORNEYS Patented Oct. 19, 1937

2,096,321

UNITED STATES PATENT OFFICE 2,096,321

TAPER ROLLER BEARING AND CAGE

William P. Cox, Canton, Ohio, assignor to The Timken Roller Bearing Company, Canton, Ohio, a corporation of Ohio Application September 12, 1935, Serial No. 40,230

3 Claims. (Cl. 308—214)

My invention relates to taper roller bearings and cages therefor and is particularly concerned with the self-contained cage and roller assembly. The invention is particularly applicable to large heavy duty roller bearings, such as those used in railway cars, rolling mills and heavy machinery.

The invention has as its principal object a taper roller bearing and cage construction wherein the rollers and cage constitute a self-contained unit and wherein the construction is simple, but strong enough for the heaviest duty.

The invention consists principally in a cage construction for taper roller bearings wherein the rollers are recessed at their small ends and the cage is disposed outwardly of the roller axes and provided with pintles disposed axially of the rollers and extending into said recess. The invention further consists in the taper roller bearing and cage and in the parts and combinations and arrangements of parts hereinafter described and claimed.

In the accompanying drawing,

Fig. 1 is a longitudinal sectional view of a taper roller bearing embodying my invention; and Fig. 2 is a partial sectional view of a modification.

In the drawing is illustrated a taper roller bearing having a cup 1 or outer bearing member provided with a conical bore 2 constituting the outer raceway, a cone 3 or inner bearing member provided with a conical portion 4 constituting an inner raceway and conical rollers 5 between said raceway portions. The bearing cone 3 has a thrust rib 6 at its large end, the retaining rib commonly formed at the small end of such bearing cones being omitted.

Disposed radially outward of the roller axes is a conical cage 7 that extends substantially parallel to said roller axes and that includes a large end ring 8, a small end ring 9, bridges 10 connecting said end rings and constituting therewith pockets that closely confine the rollers and an inturned annular flange 11 on said small end ring that is spaced from the small ends of the rollers 5 and extends substantially parallel thereto, overlapping the roller middles.

In the construction shown in Fig. 1, the rollers 5 have axial concave recesses 12 in their small ends. The cage flange 11 has threaded holes 13 in line with such recesses, and pins 14 have threaded portions screwed into said holes, said pins having curved end portions 15 that project into said recesses 12.

In the construction shown in Fig. 2, the rollers 5a have axial bores 12a and the pins 14a have enlarged heads 20 and are riveted against the inner face of said flange 11 as shown at 21, the ends of the pins 14a extending into the axial bores 12a of the rollers.

By reason of the close fit of the conical rollers in the cage pockets and the location of the cage radially outward of the roller axes and of the pins extending into the axial recesses, it is obvious that the cage and rollers form a self-contained assembly. This assembly can be easily assembled with the bearing cone and disassembled therefrom. The construction shown in Fig. 1 permits removal of individual rollers by removing the threaded pins.

Obviously, the above described construction is a strong and simple self-contained roller and cage assembly for heavy duty taper roller bearings.

What I claim is:

1. A bearing roller and cage assembly comprising a conically disposed series of conical rollers having axial recesses in their small ends and a conical cage therefor disposed outwardly of the roller axes and having a small end ring overlapping the roller middles, said cage having pockets closely confining the rollers and pintles at the small end of the cage disposed along the roller axes and extending into said recesses, said pintles having end portions threaded into said small end ring whereby said cage and rollers form a self-contained unit, and said pintles are individually removable.

2. A bearing roller and cage assembly comprising a conically disposed series of conical rollers having axial bores and a conical cage therefor disposed outwardly of the roller axes and having a small end ring overlapping the roller middles, said cage having pockets closely confining the rollers and pintles at the small end of the cage disposed along the roller axes and extending into said bores, said pintles extending through said small end ring and being riveted thereto whereby said cage and rollers form a self-contained unit.

3. A bearing roller and cage assembly comprising a conically disposed series of conical rollers having flat small end faces and having axial recesses in their small ends and a conical cage therefor disposed outwardly of the roller axes, said cage having end rings connected by bridges to form pockets closely confining the sides and ends of the rollers and the small end ring having an internal annular flange spaced from the small end faces of the rollers and extending parallel to said small end faces and overlapping the middles thereof, and a single series of pintles secured to said annular flange extending into said recesses, whereby said cage and rollers form a self-contained unit.

WILLIAM P. COX.